United States Patent [19]

Lopez

[11] Patent Number: 5,389,309
[45] Date of Patent: Feb. 14, 1995

[54] COMPOSITION AND METHOD FOR MAKING FIRE-RETARDANT MATERIALS

[76] Inventor: Richard A. Lopez, 21901 Winnebago La., Lake Forest, Calif. 92630

[21] Appl. No.: 632,011

[22] Filed: Dec. 21, 1990

[51] Int. Cl.$^6$ .............. C09K 21/00; C09K 21/14
[52] U.S. Cl. .............. 252/606; 106/18.16; 428/921; 252/378 R; 252/607; 523/179
[58] Field of Search .............. 252/607, 608, 602, 606, 252/378 R; 106/18.17, 18.16; 428/537.1, 921; 523/179

[56] References Cited

U.S. PATENT DOCUMENTS

| | | | |
|---|---|---|---|
| 3,371,058 | 2/1968 | Perizzolo | 260/291 |
| 3,513,114 | 5/1970 | Hahn et al. | 252/606 |
| 3,925,137 | 12/1975 | Kamei | 156/278 |
| 3,955,987 | 5/1976 | Schaar et al. | 106/15 FP |
| 3,973,103 | 8/1976 | Tadewald | 219/543 |
| 4,046,955 | 9/1977 | Bye | 428/920 X |
| 4,076,540 | 2/1978 | Stossel | 106/15 FP |
| 4,141,745 | 2/1979 | Bye | 106/15.05 X |
| 4,174,223 | 11/1979 | Steen | 106/15.16 |
| 4,461,720 | 7/1984 | Loyvet et al. | 252/607 |
| 4,468,495 | 8/1984 | Pearson | 525/158 |
| 4,552,803 | 11/1985 | Pearson | 428/262 |
| 4,661,398 | 4/1987 | Ellis | 428/245 |
| 4,701,373 | 10/1987 | Fuchs et al. | 428/326 |
| 4,725,382 | 2/1988 | Lewchalermwong | 252/607 |
| 4,741,971 | 5/1988 | Beck et al. | 428/537.1 |
| 4,839,065 | 6/1989 | Vandersall | 252/602 X |
| 4,908,160 | 3/1990 | Thacker | 252/608 |
| 4,965,296 | 10/1990 | Hastings | 523/179 |
| 5,009,964 | 4/1991 | Leach et al. | 428/526 |
| 5,091,097 | 2/1992 | Pennartz | 252/607 X |
| 5,091,243 | 2/1992 | Tolbert et al. | 428/921 X |

FOREIGN PATENT DOCUMENTS

| | | |
|---|---|---|
| 61-238791 | of 1986 | Japan . |
| 2122661 | 1/1984 | United Kingdom . |
| 2200363 | 8/1988 | United Kingdom . |
| 82/04059 | 11/1982 | WIPO . |

OTHER PUBLICATIONS

Dricon ® Fire Retardant Treated Wood, Product Handbook (1991).
American Plywood Association (APA) literature dated Oct. 1989 "Fire Retardant Treated Plywood Roof Sheating" including: General Information, Preliminary Examination and Testing, In–Situ Testing, Destructive Evaluation, Retrofit and Repair, Prediction of Performance, RSI Publications–Jun. 1990 article.
Spec Data–May 1989 for DRICON.
Truesdail Laboratories Inc.–Jun. 4, 1990.
Enterprise Engineering–Test Reports–Sep. 1989.

*Primary Examiner*—Robert L. Stoll
*Assistant Examiner*—Daniel S. Metzmaier
*Attorney, Agent, or Firm*—Fliesler, Dubb, Meyer & Lovejoy

[57] ABSTRACT

Fire-retardant compositions are disclosed. The compositions include at least one nitrogen-liberating compound which will release nitrogen gas during burning, a primary fire-retardant agent; casein resin, and an activator of the casein resin. In the preferred embodiment, there are two nitrogen-liberating compounds, dicyandiamide and nitro-urea, the primary fire-retardant agent is diammonium phosphate, and a filler, titanium dioxide, is also included. The compositions are prepared in a mixing tank and can be applied in a known manner, optionally under high pressure, to cellulosic products such as cloth, yarn, paper, wood and wood substrates in order to impart a fire-retardant quality thereto. Fire-retardant glue and wood laminate structures produced using the glue are also disclosed.

34 Claims, No Drawings ive size for approximately 10 to 20 wood framing members used in the construction of structures. When sold as a "fire-retardant treated" product, the wood will be suitable for construction of buildings per local building codes.

COMPOSITION AND METHOD FOR MAKING FIRE-RETARDANT MATERIALS

FIELD OF THE INVENTION

The present invention relates generally to the field of fire-retardant compositions and methods. More specifically, the present invention relates to compositions and methods of treating wood and other flammable materials to impart a fire-retardant quality thereto.

BACKGROUND OF THE INVENTION

It is known that various compounds can be used to treat cellulosic products such as cloth, yarn, paper, wood and wood substrates in order to impart thereto a flame-resistant quality. The use of wood treated with such compounds came into common usage during World War II, when it was used for the construction of blimp hangars.

Most known fire-retardant compositions make use of the same technical underpinning. These compositions comprise salt compositions, such as phosphates and sulfates, which becomes acidic under elevated temperatures. These salts can form, for example, phosphoric and sulfuric acid respectively, and other acidic phosphate and sulfate derivatives under high temperatures. The acid formed promotes charring of the treated material during exposure to fire. The resulting char reduces flammability by insulating the material from the fire, thereby reducing flame spread and penetration.

Many prior art compositions make use of active ingredients, such as ammonium sulfates, which have been found to be corrosive to metal, including any metal fasteners, such as staples or nails, used to secure the treated materials. Thus, for treatment of materials to be secured in place with metal fasteners, such as the majority of all building materials, compositions making use of less corrosive active ingredients is critical. However, many of the replacement materials, such as ammonium phosphate have high hygroscopicity (high moisture pick-up). Thus, there is a need for offsetting the hygroscopicity of the non-corrosive replacement salts.

Many of these compositions also include starches, such as molasses, in order to provide adequate charring. However, the use of such starches renders the treated material susceptible to degradation by adventitious organisms such as insects and molds.

Other fire-retardant compositions require a drying step with high heat after application to a material. This high heat step often leads to premature activation of the chemical processes designed to resist flame spread during fire. Thus, leading to acid hydrolysis of the cellulose fibers in the material treated.

Plywood sheaths are often treated with fire-retardant compositions and used as roof decking, where the temperature at the interface between the overlying shingles and the roof deck can often exceed 170° F. However, many prior art fire-retardant compositions result in degradation of the materials to which they are applied at temperatures greatly below the temperature of combustion of the materials to which they are applied. Thus, it has been found that many roof decks constructed from plywood sheaths treated with prior art fire-retardant compositions begin to lose structural integrity through acid hydrolysis. This degradation occurs even more rapidly in warmer climates. Furthermore, the presence of moisture has been found to accelerate the rate of thermal degradation of many treated products. Thus, in many cases, the treated plywood used as roof decking required replacement in as little as two to seven years.

Many prior art fire-retardant compositions were found to discolor, as well as degrade, the material treated after prolonged exposure to the elements. For example, dark, reddish-brown charred spots soon begin to appear in wood products treated with prior art compositions. This discoloration prevents the use of the treated material where an exposed natural finish is aesthetically desirable. Moreover, the degradation of wood products used for structural purposes results in the products being unsuitable for use.

Organic compounds are often added to fire-retardant compositions to seal out moisture and also to lock the active salt ingredients into the structure of the treated material, thereby also raising the threshold temperature at which activation occurs. For example, U.S. Pat. No. 4,461,720 and U.K. Patent Application GB 2,200,363 both disclose the use of melamine or derivatives thereof as binding resins or casings. These references disclose that melamine provides improved leach resistance. However, a major drawback associated with the use of melamine is its limited stability. Accordingly, storage of melamine is difficult, and any working stocks containing melamine have a very short working period before which they will set. Thus, melamine solutions must be replaced frequently, resulting in both increased handling and material costs.

There are a number of properties of natural wood that make it the product of choice for building construction. Its strength, appearance, durability, accessibility and non-corrosive nature make it ideally suited for building supports, framework and trims. However, wood is of course, highly flammable.

The treatment of wood with most prior art fire-retardant compositions has generally required the use of incising of the wood with small perforations in order to assure adequate penetration of the wood with the fire-retardant composition. However, this incising, by cutting through the fibers of the wood leads to a reduction in the structural integrity of the treated wood.

Due to the combustible nature of wood, building codes in virtually all U.S. municipalities restrict the use of untreated wood to certain applications. However, the fire-retardant treatment of wood has broadened the useful scope of both wood and wood substrates because these municipalities require the use of non-combustible materials, including treated wood, in applications where untreated wood would not be permitted. These municipalities rely on outside certification agencies to certify which fire-retardant treated materials meet the agency's criteria for strength, durability, fire-retardance and other properties. For example, all municipalities in western states rely on the International Conference of Building Officials (ICBO) to certify fire-retardant treated wood as suitable for all types of construction.

SUMMARY OF THE INVENTION

Briefly, the present invention provide a process of preparing a fire-retardant composition without the use of a high-heat drawing process, comprising, providing a mixing tank, adding to the mixing tank at least one, and preferably two nitrogen-liberating compounds which will release nitrogen gas in the presence of flame, adding to the mixing tank a primary fire-retardant agent, adding casein resin to the mixing tank, adding an activator of the casein resin to the mixing tank, and mixing the contents of the mixing tank until a smooth chemical blend is obtained. Preferably continuous mixing of the mixing tank is provided throughout the process. In a preferred embodiment, the two nitrogen-liberating compounds are dicyandiamide and a urea compound, and the primary fire-retardant agent is diammonium phosphate. Preferably, the process additionally comprises the addition of a filler compound, which in a preferred embodiment is titanium dioxide. Water is preferably added to the mixing tank as binding agent.

In accordance with another aspect of the present invention, there is provided a fire-retardant composition which is noncorrosive to metal, does not attract adventitious organisms, does not require elevated temperatures to dry and is resistant to activation at temperatures below those found in a fire. The composition can be prepared according to the foregoing process. The composition comprises at least one nitrogen-liberating compound which will release nitrogen gas in the presence of a flame, a primary fire-retardant agent, a casein resin and an activator of the casein resin. In a preferred embodiment of the composition, there are two nitrogen-liberating compounds, dicyandiamide and urea-nitro, the primary fire-retardant agent is diammonium phosphate and the composition additionally comprises a filler compound, titanium dioxide.

In still another aspect of the present invention, there is provided a process for imparting a fire-retardant quality to a flammable material comprising applying a composition of the present invention to the material under high pressure and allowing the material to dry at ambient temperature and pressure. The application step, preferably, comprises placing the material in a vessel containing the composition at an elevated pressure. The present invention also provides the material produced through this process. Preferably, this material is treated cloth, yarn, paper, wood or wood substrates.

In still another aspect of the present invention, the fire-retardant compositions are formulated in combination with a conventional glue substrate. In a preferred embodiment, this fire-retardant glue is used to bind the laminate structure of plywood and similar laminar wood structures.

Further objects, features and other advantages of the present invention will become apparent from the ensuing detailed description.

DETAILED DESCRIPTION OF THE PREFERRED EMBODIMENT

The present invention provides a superior fire-retardant treatment composition, including the use of superior resins and a superior material processing procedure, heretofore never applied in fire-retardant compositions.

The composition of the present invention includes a conventional fire-retardant, such as borax, boric acid, an ammonium phosphate compound, aluminum sulfate, aluminum hydrate, or chlorinated paraffins. This primary fire-retardant agent, as discussed above in the foregoing background of the invention, serves to form a layer of carbonized material in order to inhibit the further spread of flame through the material treated with the fire-retardant. The primary fire-retardant generally comprises from 2% to about 50% of the total composition (w/v), preferably from about 5% to about 20%.

Preferably, diammonium phosphate is used as primary fire-retardant because we have found this ingredient to be less corrosive to metal fasteners which can be used with the treated materials. Additionally, diammonium phosphate forms finer crystals which more readily penetrate the pores of the porous materials to which the compositions are applied. Moreover, this material has a high heat of activation. In other words, high temperatures are required to convert the diammonium phosphate into the acidic forms resulting in the fire-retardant effect.

The composition of the present invention also comprises nitrogen containing compounds which liberate gaseous nitrogen during burning. In the presence of a fire, these compounds liberate nitrogen gas, resulting in foaming of the carbonized layer on the outer surface of the treated material. This foaming increases the thickness of the carbonized layer, resulting in increased insulation of the unburned material below. At the same time the liberated nitrogen serves to dilute oxygen in the vicinity of the material to retard combustion. Such nitrogen releasing compounds include dicyandiamide, urea compounds, triethanolamine, and triazine compounds.

In the preferred embodiment, dicyandiamide in combination with a urea compound, such as urea-nitro, are used as nitrogen-liberating compounds. Use of this combination serves to provide a buffering effect to regulate the pH.

In the preferred embodiment of the fire-retardant composition of the present invention, dicyandiamide is used in approximately a 1:2 ratio relative to urea-nitro. We have found that this ratio achieves the appropriate pH in the resulting composition. The total amount of nitrogen-liberating compounds present in the composition is generally in the range from about 2% to about 60% (w/v) of the total composition. However, preferably, the nitrogen-liberating compounds comprise from about 7.5% to about 30% of the composition.

The nitrogen-liberating compounds are generally mixed in water prior to addition of the other ingredients. This allows the proper buffering effect to occur. The primary fire-retardant can then be dissolved in the resulting solution. The water also serves as a binding agent for the final composition.

Optionally, a filler can be added to the composition to provide the composition with consistency and to keep the composition from separating. We have found that titanium dioxide provides excellent results in this regard. Thus, in the preferred embodiment, the fire-retardant composition of the present invention includes titanium dioxide in a concentration from about 0.25% to about 10%, preferably from about 0.75% to about 3%. The filler compound is preferably, suspended separately in water, prior to being mixed with the other components of the composition in order to assure complete mixing. The filler is also, preferably, added prior to addition of the resin component in order to allow more facile mixing of the filler with the composition.

Conventional additives can be added to the composition, such as coloring agents, odor modifying agents, thickeners, glue and the like.

Generally, the final component added to the fire-retardant composition is the resin. This component is added last due to its tendency to inhibit the suspension and miscibility of the other components of the composition. We have discovered that use of a urea/formaldehyde resin polymer in water, such as those available from National Casein Resin Corp. of Santa Ana, Calif. (herein, "Casein resin" Casein resin provides a composition of superior characteristics. The Casein resin provides a casing for the treated material. Unlike many prior art resins, Casein casing will not corrode metal. Additionally, Casein is absorbed easily by wood and provides structural rigidity thereto. Moreover, the structure of the wood is enhanced by the resin and will remain intact. Additionally, the Casein resin provides an impervious barrier to the treated material. Thus, the treated materials are protected from water damage and from other elements. Moreover, the protection from water offsets the hygroscopicity of highly hygroscopic primary fire-retardants such as ammonium phosphate.

The Casein resin preferably comprises from 10% to 90% (w/v) of the total composition. More preferably, the Casein resin comprise from 30% to 70%. Additionally, in order to polymerize the resin, an activator is generally required. One such activator is the RESIN MP-5 CATALYST a trademark of, and available from National Casein Resin Corp. of Santa Ana, Calif. The RESIN MP-5 CATALYST is a composition containing melamine and an acid salt catalyst. This activator is usually added after the resin and is added in a ratio in the range of from 1:100 to 1:1 to the resin. Higher amounts of activator will cause the resin to polymerize very quickly and at lower temperatures, while lower amounts will require longer times and higher temperatures. Thus, preferably, the activator is added within the range of 1:25 to 1:5 in ratio to the resin in order to allow for adequate shelf life of the composition while still allowing for practicable polymerization times and conditions.

The composition of the present invention provides a number of properties which differ greatly and substantially in kind and scope from prior art fire-retardant composition. These properties provide several significant advantages. For example, the composition is non-corrosive to metal and has no starches to degrade wood fiber or attract adventitious organisms. The composition does not require high heat, such as that produced through the use of a kiln, to dry, thereby eliminating any premature activation of the fire-retardant occurring in the drying step. Moreover, the composition has a high heat of activation, thereby substantially eliminating the degradation of treated materials by exposure to temperatures below those found in a fire. Additionally, the substantial elimination of premature activation inhibits the formation of discoloration which prevents the use of the treated materials where an exposed natural finish is aesthetically desirable.

As stated above, the composition also provides structural rigidity to the material to which it is applied. Thus, should the treated material begin to decay from any of a variety of causes, such as through insect infestation, structural rigidity is retained. Also, the composition is stable for long periods of times, which allow the composition to be prepared and stored for shipment and also allows for reuse of recovered composition after the treatment process.

The fire-retardant composition can also be applied to any flammable material to decrease flammability. For example, the compositions can be applied to porous materials, including cellulosic products such as cloth, yarn, paper, wood and wood substrates. The compositions can be applied in any conventional manner. For other materials easily saturated, such as yarn and paper, the materials can simply be soaked in the composition. Other materials can be coated by brushing or spraying. However, preferably, materials which are not readily penetrated, such as wood, are treated by exposure to the fire-retardant composition at an elevated pressure in a pressure vessel or other equivalent equipment which will be known to one of skill in the art. After the materials are exposed to the composition under high pressure, remaining composition can be recovered and reused. Advantageously, wood treated with the composition of the present invention under pressure requires no incising to permit adequate penetration.

Preferably, the separate pieces of material to be treated are separated prior to treatment to allow even access to the composition while under pressure treatment. Advantageously, this separation can be accomplished by simple "sticking" with small sticks between the separate pieces of material.

In order to recover excess composition on the outside of the treated material, after the materials are removed from the treatment vessel, the materials can optionally be brought to a recovery area where excess composition is allowed to drip off the materials and is collected for reuse.

As discussed above, no high heat drying step is required in the use of the present composition. The materials can be dried by exposure to climatic air flow. Drying will occur more rapidly under warmer, drier conditions. The drying area can be outdoors in a warm, dry climate, or indoors where required by outside weather conditions. Preferably, in order to promote drying, the treated materials are separated to allow airflow therearound. Advantageously, if the materials are sticked prior to the treatment process, they can be left in this sticked configuration in order to maintain separation during the drying process.

For wood, drying proceeds until the hygroscopic moisture content is at a maximum of 19% or below. Wood treated by pressure treatment will be impregnated with the fire-retardant composition to provide superior fire retardance and structural rigidity. Moreover, planing of such treated wood up to about as much as 1/16 inch will not remove all the fire-retardant composition, will thus, not remove the fire-retardant characteristics of the treated wood. Additionally, the deeper planing of one side of a four-sided treated board will leave substantial fire-retardant qualities in the board.

The following examples are provided to demonstrate a preferred method of preparing and using the fire-retardant compositions of the present invention. As such, they are intended to illustrate, and not to limit the invention in any way.

EXAMPLE 1 PREPARATION OF A FIRE-RETARDANT COMPOSITION

A. To a mixing tank, add six 55 gallon drums of water.

B. Add four 55.1 pound bags of Aero-Dicyandiamide (available from American Cyanamid of Toronto, Ontario, Canada).

C. Commence mixing, and continue mixing throughout.

D. Add twelve 80 pound bags of Urea-Nitro (46%) (available from Unocal Chemical, Los Angeles Chemical Division.

E. Add four 100 pound bags of Diammonium Phosphate.

F. To a separate 55 gallon drum of water, add one 50 pound bag of Titanium Dioxide, and mix.

G. Add the Titanium Dioxide Solution to the mixing tank.

H. Divide one 600 pound drum of Casein Resin 1750 (available from National Casein Resin of Santa Ana, Calif.) into two separate empty 55 gallon drums.

I. To each drum containing Casein Resin, add one 50 pound bag of RESIN MP-5 CATALYST, a composition containing melamine and an acid salt catalyst (also available from National Casein Resin), and mix. Casein RESIN MP-5 CATALYST is a trademark of national Casein Resin of Santa Ana, Calif.

J. Top off each drum with water and mix.

K. Add contents of both drums to mixing tank.

L. Continue mixing until a smooth texture chemical blend is obtained.

M. Transfer to chemical holding tank, and store until ready for use.

The composition of Example 1 is ready for immediate application to the material to be treated. The composition can be stored in a sealed container for an indefinite period of time without setting.

In a preferred embodiment of the invention, the composition of Example 1 is applied to Coast Douglas Fir boards. This type of wood is generally specified for use as structural support in all types of buildings. An illustrative example of the application of the composition to such boards is shown in Example 2.

EXAMPLE 2 TREATMENT OF WOOD BOARDS

A. Coast Douglas Fir Boards (2" by 4") were visually inspected for mill grade, size, moisture content, and quality. The measured moisture content was under 19%.

B. The boards were then stacked with sticking to separate the boards within the stack (lift).

C. Each lift of boards was placed on steel horizontal rolling lumber racks (pallets).

D. Each lift of boards was rolled into a Horizontal Pressure Vessel.

E. The vessel door is firmly and properly sealed and the composition of Example 1 was pumped into the vessel to a pressure of 100 psi.

F. Treatment in the vessel proceeded for 60 minutes, and the vessel was emptied of fire-retardant composition.

G. Each stack of wood is then rolled out of the vessel and transferred to a horizontal receptacle recovery tank to recapture any excess fire-retardant composition.

H. The stacks were then transferred to the drying area where they were allowed to dry exposed to the atmosphere at ambient temperature (varied from 55° F. to 90° F.) for a period of 5 days, until measured moisture content was below 19%. The boards were then prepared for shipment.

The treated wood from Example 2, advantageously, conforms to the regulatory mandated ICBO requirements for fire-retardant treated wood for structural application in all types of buildings or structures, including the standards for flame spread, hygroscopic properties, strength, and corrosiveness. Wood treated in accordance with the method of Example 2 has been found to comply with the regulatory standards in effect as of the date of this application under the Uniform Building Code (UBC) Chapter 42-1 for fire-retardant treated wood. This chapter mandates that wood comply with the standards promulgated by the American Standard Testing Method (ASTM) E-84, which are equivalent to the standards of Underwriter's Laboratories (UL) 723. The standards promulgated therein include UBC Standard 25-28 for hygroscopic properties, UBC Standard 25-29 for strength, UBC Chapter 4 Section 407 F for spread, and the United States Military Specification No. MIL-L-19140E, Paragraph 4.6.5.2 (Amendment 1, dated Oct. 1, 1985) for corrosiveness.

In another aspect of the present invention, the fire-retardant composition is formulated in combination with a conventional glue substrate to produce a fire-retardant glue. In a preferred embodiment, this fire-retardant glue is used to bind the laminate structure of plywood and similar laminar wood structures.

It will be appreciated that certain structural variations may suggest themselves to those skilled in the art. The foregoing detailed description is to be clearly understood as given by way of illustration, the spirit and scope of this invention being limited solely by the appended claims.

What is claimed is:

1. A fire retardant composition which is noncorrosive to metal, and dries at ambient temperatures, comprising:
   dicyandiamide and urea-nitro for releasing nitrogen gas in the presence of flame;
   an ammonium phosphate compound;
   a urea/formaldehyde resin polymer in water; and
   an activator of the resin, said activator comprising melamine and an acid salt catalyst.

2. The composition of claim 1 wherein the ammonium phosphate compound is diammonium phosphate.

3. The composition of claim 1, wherein the ammonium phosphate compound is included at a ratio of from 2 % to about 50% (w/v) in the composition.

4. The composition of claim 3, wherein the ratio is from about 5 % to about 20% (w/v).

5. The composition of claim 1, wherein the dicyandiamide is included at a 1:2 ratio relative to the urea-nitro.

6. The composition of claim 1, wherein the dicyandiamide and the urea-nitro are included together at a ratio of from about 2% to about 60% (w/v) in the composition.

7. The composition of claim 6 wherein the ratio is from about 7.5% to about 30% (w/v).

8. The composition of claim 1 wherein the urea/formaldehyde resin polymer is included at a ratio of from 10% to 90% (w/v) in the composition.

9. The composition of claim 1, wherein the activator is included at a ratio of from 1:100 to 1:1 to the urea/formaldehyde rein polymer.

10. The composition of claim 9, wherein the ratio is 1:25 to 1:5.

11. The composition of claim 1, wherein the composition further comprises a filler.

12. The composition of claim 11, wherein the filler comprises titanium dioxide.

13. The composition of claim 12, wherein the titanium dioxide is included at a ratio of from about 0.25% to about 10% (w/v) in the composition.

14. The composition of claim 13, wherein the ratio is from about 0.75 % to about 3 % (w/v).

15. The composition of claim 1, wherein the composition comprises:
   the dicyandiamide and the urea-nitro at a ratio of from about 2% to about 60% (w/v) in the composition;
   the ammonium phosphate compound at a ratio of from 2% to about 50% (w/v) in the composition; and
   the urea/formaldehyde resin polymer at a ratio of from 10% to 90% (w/v) in the composition.

16. The composition of claim 15, wherein the ammonium phosphate compound is diammonium phosphate.

17. The composition of claim 16, wherein the dicyandiamide is included at a 1:2 ratio relative to the urea-nitro.

18. A process for preparing a fire-retardant composition without the use of a high heat drying process, comprising:
providing a mixing tank;
adding to the mixing tank dicyandiamide and urea-nitro for releasing nitrogen gas in the presence of flame;
adding to the mixing tank an ammonium phosphate compound;
adding a urea/formaldehyde resin polymer in water to the mixing tank;
activating the resin in the mixing tank by adding an activator, said activator comprising melamine and an acid salt catalyst; and
mixing the contents of the mixing tank until a smooth chemical blend is obtained.

19. The composition of claim 18, wherein the ammonium phosphate compound is diammonium phosphate.

20. The composition of claim 18, wherein the ammonium phosphate compound is included at a ratio of from 2% to about 50% (w/v) in the composition.

21. The composition of claim 20, wherein the ratio is from about 5 % to about 20% (w/v).

22. The composition of claim 18, wherein the dicyandiamide is included at a 1:2 ratio relative to the urea-nitro.

23. The composition of claim 18, wherein the dicyandiamide and the urea-nitro are included together at a ratio of from about 2% to about 60% (w/v) in the composition.

24. The composition of claim 23, wherein the ratio is from about 7.5 % to about 30% (w/v).

25. The composition of claim 18, wherein the urea/formaldehyde resin polymer is included at a ratio of from 10% to 90% (w/v) in the composition.

26. The composition of claim 18, wherein the activator is included at a ratio of from 1:100 to 1:1 to the urea/formaldehyde rein polymer.

27. The composition of claim 26, wherein the ratio is 1:25 to 1:5.

28. The composition of claim 18, wherein the composition further comprises a filler.

29. The composition of claim 28, wherein the filler comprises titanium dioxide.

30. The composition of claim 29, wherein the titanium dioxide is included at a ratio of from about 0.25 % to about 10% (w/v) in the composition.

31. The composition of claim 30, wherein the ratio is from about 0.75 % to about 3 % (w/v).

32. The composition of claim 18, wherein the composition comprises:
the dicyandiamide and the urea-nitro at a ratio of from about 2% to about 60% (w/v) in the composition;
the ammonium phosphate compound at a ratio of from 2% to about 50% (w/v) in the composition; and
the urea/formaldehyde resin polymer at a ratio of from 10% to 90% (w/v) in the composition.

33. The composition of claim 32, wherein the ammonium phosphate compound is diammonium phosphate.

34. The composition of claim 33, wherein the dicyandiamide is included at a 1:2 ratio relative to the urea-nitro.

* * * * *